United States Patent [19]

Sagan et al.

[11] Patent Number: 4,485,960

[45] Date of Patent: Dec. 4, 1984

[54] JOINT FOR JOINING CLAD MATERIALS

[75] Inventors: Stanley S. Sagan, Springfield, Pa.; Jay L. Kratz, Cherry Hill, N.J.

[73] Assignee: Westinghouse Electric Corp., Pittsburgh, Pa.

[21] Appl. No.: 412,435

[22] Filed: Aug. 27, 1982

[51] Int. Cl.$^3$ .................................................. B23K 20/08
[52] U.S. Cl. ...................................... 228/107; 228/175
[58] Field of Search ............... 228/107, 108, 109, 175, 228/226; 219/76.14, 76.15, 77; 428/660, 683, 940

[56] References Cited

U.S. PATENT DOCUMENTS

| | | | |
|---|---|---|---|
| 830,030 | 9/1906 | Wille | 219/77 |
| 2,177,868 | 10/1939 | Chapman | 219/76.14 |
| 2,815,436 | 12/1957 | Bland | 219/76.15 |
| 3,125,805 | 3/1964 | Horigan | 29/492 |
| 3,295,197 | 1/1967 | Bunn et al. | 228/175 |
| 3,464,802 | 9/1969 | Meyer | 29/183.5 |
| 3,614,827 | 10/1971 | Knop | 29/492 |
| 3,624,345 | 11/1971 | Armstrong | 219/76.14 |
| 3,733,686 | 5/1973 | Maucher | 228/175 X |
| 3,735,476 | 5/1973 | Deribas | 29/470.1 |
| 3,790,354 | 2/1974 | Richter | 428/940 |
| 4,027,135 | 5/1977 | Barger | 219/76.14 |
| 4,046,100 | 9/1977 | Kuonen et al. | 219/76.1 |
| 4,073,427 | 2/1978 | Keifert et al. | 228/175 X |
| 4,142,664 | 3/1979 | Feige | 228/226 X |

Primary Examiner—Kenneth J. Ramsey
Assistant Examiner—M. Jordan
Attorney, Agent, or Firm—F. J. Baehr, Jr.

[57] ABSTRACT

A joint is provided which permits clad members to be welded together and later used in a corrosive environment without subsequent degradation of the base or cladding materials. The use of an intermediate metallic layer prevents the close proximity of galvanically incompatible materials in brackish or saline environments.

14 Claims, 7 Drawing Figures

JOINT FOR JOINING CLAD MATERIALS

BACKGROUND AND SUMMARY OF THE INVENTION

The present invention relates generally to an improved joint for joining clad materials and, in particular, to the joining of clad materials in which the base material and cladding material are galvanically incompatible for use in a corrosive environment.

The cladding of ferrous-base alloys with other metals having properties desired for particular application is much practiced in the art since ferrous-base alloys offer a relatively inexpensive base material which has good structural and fabrication properties. Thus, carbon steel has been clad with metals such as aluminum or titanium which provide a high corrosion resistance. One especially attractive combination is carbon steel clad with titanium. Pure titanium has outstanding corrosion resistance in environments such as plain water, sea-water, or brackish water, but, compared to carbon steel, is an expensive material which also does not satisfy the strength requirements for some applications. On the other hand, carbon steel is relatively inexpensive compared with titanium and possesses mechanical properties which are desirable for many structural components, but can be destructively attacked by corrosive environments. When a base of carbon steel is clad with titanium, the resulting clad material has the beneficial structural properties of carbon steel and the corrosion resistance properties of titanium. Similarly, aluminum has beneficial corrosion resistance quantities which, when combined with a base of carbon steel, provides the dual benefits described above in relation to the carbon steel-titanium clad materials. Beside titanium and aluminum nickel, copper, and tantalum have been used in conjunction with carbon steel bases in many applications. U.S. Pat. No. 3,464,802 issued to Meyer on Sept. 2, 1969 and U.S. Pat. No. 3,125,805 issued to Horrigan on Mar. 24, 1964 describe and illustrate the use of a corrosion resistant metal as a cladding on a carbon steel base.

In many cases the cladding material is explosively welded to the base material in a clad material assembly. The process of explosively welding dissimilar metals together is described in U.S. Pat. No. 3,614,827 issued to Knop et al. on Oct. 26, 1971 and U.S. Pat. No. 3,735,476 issued to Deribas et al. on May 29, 1973. Explosive welding has been found to be an advantageous way of metallurgically bonding two dissimilar metals because, generally, the metals cannot be easily welded together with the use of conventional methods because brittle zones of intermetallic alloys are formed due to diffusion during heating. These zones can result in the formation of cracks when exposed to thermal or mechanical stresses which could possibly result in the rupturing of the weld bond. This same problem also occurs when attempting to weld two explosively clad metal plates together. In apparatus which comprises explosively clad metal plates, certain difficulties are often encountered when welding the metal plates together or when welding tubes or pipes to the clad metal plates. This is true, in particular, if the two metals bonded by the explosive cladding operation can form intermetallic compounds or other weakened compounds as in the case of steel bonded to aluminum, molybdenum, tantalum, titanium, niobium, tungsten, palladium or zirconium or in the case where copper is bonded with aluminum. If the welding heat introduced into the bonding zone is too high, brittle intermetallic substances can be formed by diffusion and can lead to a detachment of the cladding layer at the locations affected by the heat. This results in brittleness of the weld seam and severely reduces its corrosion resistance.

Two major problems must be overcome when clad metallic plates are used in construction. First, the plates must be made in such a way that they are able to be joined to other members without creating the brittleness, described above, which can occur when two dissimilar metals are welded together. Secondly, in the regions near the edge of clad metal plates, the two metallic compounds can react destructively when they are disposed proximate each other in a corrosive environment such as seawater. This is caused by the galvanic incompatibility of the two materials and results in the destruction of one or both of the materials. For example, when aluminum and carbon steel are placed in close proximity to each other in a seawater environment, the aluminum dissolves in order to galvanically protect the steel. Similarly, when carbon steel and titanium are combined in a corrosive environment, the carbon steel is dissolved to galvanically protect the titanium. When aluminum and copper are combined in this type of environment, the aluminum is attacked by the copper and when titanium and copper are placed in close proximity within a brackish solution, deep pitting of the copper occurs.

In heat exchangers in which brackish or other saline water is used, this problem becomes acute. Since the tubing of a heat exchanger accounts for a significant portion of the overall cost of the heat exchanger, it is economically advantageous to manufacture the tubing from a material which provides the desirable heat conductivity characteristics at a minimal cost. In many cases, the most desirable material is aluminum. Since the tubes extend through and are welded to a tube sheet, it is necessary that the material of the tube and the material of the tube sheet are compatible since they will be existing in close proximity to each other within a highly corrosive environment such as saltwater and since they generally must be welded together. This application calls for aluminum tubes to be inserted through a tube sheet which has an aluminum surface. Since a tube sheet which is made entirely from aluminum would be prohibitively expensive and would not possess the required structural characteristics, the tube sheet can be made of carbon steel as a base material which is clad with aluminum. Therefore, this is a typical application in which the problems concerning dissimilar metals within corrosive environments and the welding of dissimilar metals, as discussed above, can readily occur.

The present invention provides a clad metal plate which comprises a base member which is made of a material with good structural characteristics, such as carbon steel, a cladding layer made of a material with good corrosion-resistant characteristics, such as titanium or aluminum, and an intermediate layer disposed between the base member and the cladding material in areas where the base and cladding materials would normally be proximate each other within a corrosive environment such as along the edges of the clad plate. The intermediate layer can be any material which is weldably compatible with the base material and does not react destructively with the cladding material when placed in a corrosive environment. When the base material is carbon steel and the cladding material is either titanium or aluminum, the intermediate layer can be Inconel 600, Inconel 625, 304 stainless steel or 316 stainless steel among others.

The intermediate layer of a clad plate made in accordance with the present invention can be disposed in a recess in the base material so that the top layer of the intermediate material is generally coplanar with that of the top surface of the base material. It can be either explosively welded or otherwise clad to the base material or disposed within the recess as a weld deposit. The cladding layer can then be explosively or otherwise welded to the base material and intermediate layer with the edges of the cladding material being recessed from the edge of the plate so that the cladding material is not proximate the base material along its edge. When two plates made in accordance with the present invention are welded together along their edges, the carbon steel base members can be welded together using conventional welding techniques. The respective intermediate layers of the two plates can then be welded together using a weld deposit which is compatible with the intermediate layer and which does not form brittle zones between the plates or regions which have reduced corrosion resistance. Since the cladding layers of each of the respective plates are recessed from the welded edge, they need not be metallurgically joined to each other.

The present invention provides a construction by which clad metal plates can be constructed in a way that avoids proximity of dissimilar metals which, in a corrosive environment such as seawater, would otherwise react destructively with each other due to their galvanic incompatibility.

DESCRIPTION OF THE PREFERRED EMBODIMENT

The present invention relates generally to clad metal plates and, more specifically, to the edge regions of clad metal plates which are exposed to potentially corrosive environments.

Figure 1:
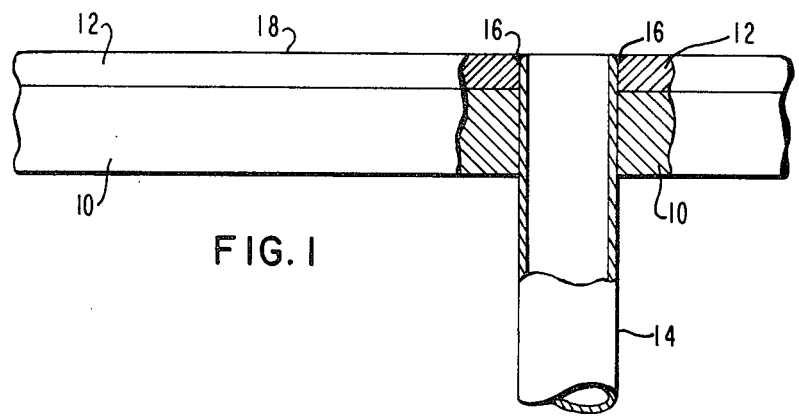
FIG. 1 illustrates an application in which a tube sheet is clad with a material which is compatible with a tube which extends therethrough.

FIG. 1 shows a typical application where clad metal plates are utilized. The tube sheet comprises a base metal portion 10 and a cladding layer 12. The base member 10 is generally made of a material which has high structural characteristics, such as carbon steel, and the cladding material 12 is generally made of a material which has high corrosion resistance qualities, such as aluminum or titanium. In the example shown in FIG. 1, the cladding material 12 would logically be chosen to be the same material as the tube 14 which extends through the tube sheet as shown. The choice of identical materials between the tube 14 and the cladding material 12 allows the tube to be welded to the tube sheet with welds 16 which are between identical materials which greatly reduces potential weakness in the structural integrity of the weld and also greatly simplifies the manufacturing procedure.

In the example shown in FIG. 1 it should be understood that this configuration would be suitable for a situation where a corrosive environment, such as seawater, would be expected to be in contact with the upper surface 18 of the cladding material 12 and the internal portion of the tube 14. The tube sheet and tube combination which is illustrated in FIG. 1 is only one example of many in which cladding material serves the purpose of providing the dual qualities of high corrosion resistance along with good structural integrity.

Figure 2:
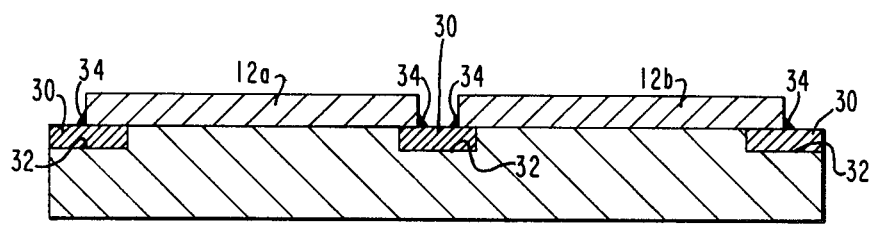
FIG. 2 illustrates the applicability of the present invention to large clad sheets whose size limits the practicability of completely bonding the entire cladding with a single explosive welding operation.

Cladding operations are typically done by explosively welding a clad plate to the base member. However, in situations where a very large base member must be clad, it is difficult to explosively weld the entire top cladding surface to the base member in one single operation. When separate operations are utilized, some means must be provided to protect the integrity of the overall clad member and to prevent the cladding and base member materials from being in close proximity to each other in the presence of a corrosive environment. FIG. 2 illustrates the present invention as it would be applied to the above-described problem situation. FIG. 2 illustrates a large base member 10, which is clad with two separate cladding layers, or sheets 12a and 12b. It should be apparent that, around the edges of the cladding members, 12a and 12b, some means must be provided to prevent the cladding layer from being in close proximity to the base member 10 while in the presence of a corrosive environment. A plate made in accordance with the present invention comprises an intermediate layer or ribbon 30 disposed between the base member 10 and the cladding members, 12a and 12b, in the regions of the edges of the cladding members. The intermediate layer 30 is normally a material which is galvanically compatible with both the base member 10 and the cladding layers, 12a and 12b. The intermediate layer 30 can be metallurgically bonded to the base member 10 in two basic ways. First, recesses 32 can be formed in the upper surface of the base member 10. Then, the intermediate layer 30 can be either explosively welded into the recess 32 or, alternatively, the intermediate layer 30 can be disposed in the recess by being weld-deposited. After the intermediate layers 30 are disposed within the recesses 32, the upper surface of the intermediate layer 30 is formed in such a way that it is coplanar with the upper surface of the base member 10. The cladding layers, 12a and 12b, can then be explosively welded to both the base member 10 and the intermediate layers 30. Following the explosive welding operation, the cladding members, 12a and 12b, can be welded to the intermediate layer 30 along the edges of the cladding members, 12a and 12b, as shown by the exemplary welds 34. If the cladding material, 12a or 12b, is either aluminum or titanium, the weld 34 is not an advisable addition to the clad member shown in FIG. 2 because of metallurgical incompatibility. However, it should be understood that the weld 34 is not a necessary element of the present invention even in applications where it is possible. It should be noted that the intermediate layer 30 is only required where the combination of the base material 10, the cladding material (12a or 12b) and a corrosive environment, such as seawater, are all proximate each other. Therefore, the intermediate layer of the present invention is required only near the edges of the cladding plate. The region directly under the center of the cladding plate (for example, cladding plate 12a) need not comprise the intermediate layer 30 because of the impossibility of seawater entering the region between the explosively welded members. As described above, it should be understood that the base member 10 would typically be made of a carbon steel while the cladding members, 12a and 12b, would typically be made of titanium or aluminum, although it should be understood that other corrosion-resistant materials could also be suitable. In the case where a carbon steel base 10 is used in conjunction with a titanium or aluminum cladding layer 12a, the intermediate layer 30 would typically be made of Inconel 600, Inconel 625, 304 stainless steel or 316 stainless steel.

Figure 3:
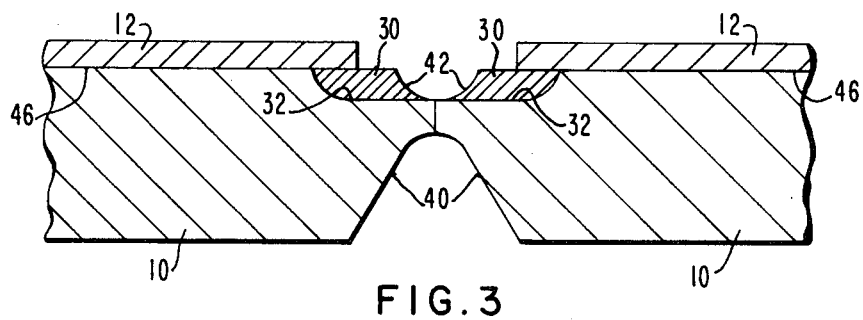
FIG. 3 shows two clad plates made in accordance with the present invention and prepared for welding together.

FIG. 3 illustrates the present invention as applied to clad metal plates which are required to be welded together. Each of the two plates shown in FIG. 3 are identical and therefore the same reference numerals will be used to identify identical members of the two plates. Each plate has a base member 10 which is clad with a cladding member 12. Proximate the edges of the cladding member 12, an intermediate layer 30 is disposed in a recess 32 which is formed in the upper surface of the base member 10. Each of the clad plates is further prepared by forming a weld preparation 40 in the base member side of the plate and a weld preparation 42 on the clad side. Again, it should be apparent that the intermediate layer 30 is only required to be placed between the base member 10 and the cladding material 12 along the edge regions of the cladding material where it would potentially be proximate the base material 10 in the presence of a corrosive environment. The region 46 which lies between the base member 10 and the cladding layer 12, but not proximate the edges of the cladding member 12, does not need to be protected with the intermediate layer 30 because, although the base member 10 and the cladding material 12 are in direct contact with each other, they are not also in the presence of a potentially corrosive environment, such as brackish water, in which the galvanic incompatibility of the two materials could react destructively.

Figure 4:
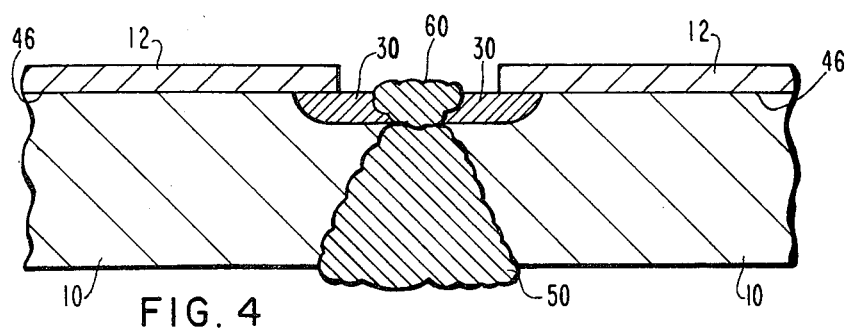
FIG. 4 shows the plates of FIG. 3 welded together.

FIG. 4 illustrates the same two plates that were shown in FIG. 3. Each comprises a base member 10 and a cladding member 12 and each includes an intermediate layer 30 between the base member 10 and the cladding layer 12 in the region proximate the edges of the cladding layer 12. It should also be noted in FIG. 4 that the intermediate layer 30 is not required to extend along the entire interface region between the base member 10 and the cladding layer 12. The interface area 46 which lies between the case member 10 and the cladding layer 12, but which is not capable of coming into contact with a corrosive environment need not be provided with a separation member, such as the intermediate member 30. FIG. 4 illustrates the welds that would be applied to join the two illustrated clad plates together. The first weld 50 joins the two base members together. It would employ standard welding techniques that would normally be used to weld two carbon steel members together. Weld 60 joins the two intermediate layers 30 together. Its composition would depend upon the material chosen for the intermediate layer 30. The specific materials used for the cladding layer 12, the intermediate layer 30, and the weld material 60 will be described in greater detail below. However, it should be understood that the choice of materials of the intermediate layer 30 is determined by its compatibility to both the base member 10 and the cladding layer 12. Similarly, the weld material 60 is chosen for its compatibility to the intermediate member 30. It should also be noted in FIG. 4 that the present invention provides for the welding of two clad plates in which only similar metals are joined. For example, the welds 50 join carbon steel to carbon steel and the weld 60 joins the two intermediate layers 30 which are made of an identical material.

Figure 5:
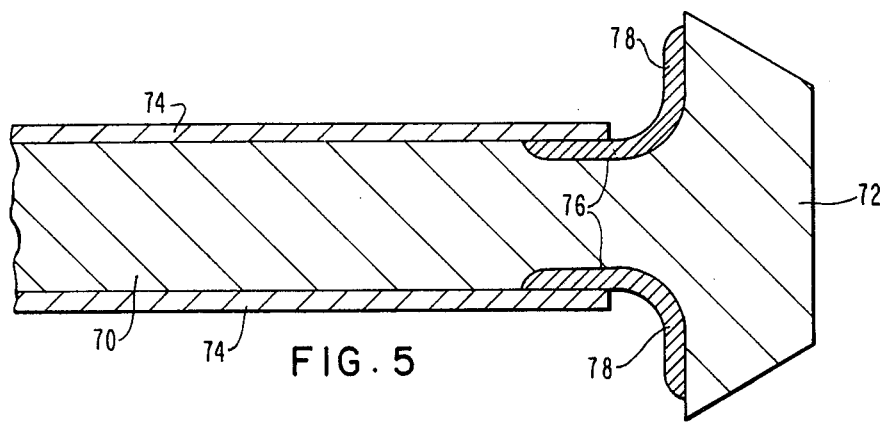
FIG. 5 shows the present invention as applied to a plate which has a flared end.

FIG. 5 illustrates a typical example where the present invention can be applied in a way to avoid close proximity between the cladding layer and the base member in a corrosive environment. In FIG. 5, the base member 70 is made of carbon steel and has an end portion 72 which is shaped to facilitate its welding to another member. This situation could arise in a heat exchanger in which the tube sheet is shaped in such a way that the outer edge is enlarged to provide a high strength welding connection to the shell of the heat exchanger. The base member 70 with its enlarged edge portion 72 can be clad with a cladding member 74 in accordance with the present invention by forming a recess 76 in the base member 70 proximate the position where the edge of the cladding material 74 will be disposed. In this recess 76, an intermediate material 78 is disposed by weld deposits. After the outer surface of this intermediate material 78 is machined to be coplanar with the outer surfaces of the base member 70, the cladding layer 74 can be explosively welded to both sides of the base member 70. As can be seen in FIG. 5, the edges of the cladding layer 74 do not come into close proximity with the base material 70 and, in the event that these material would normally have been exposed to a corrosive environment, such as seawater, destruction due to galvanic incompatibility will not be induced.

Figure 6:
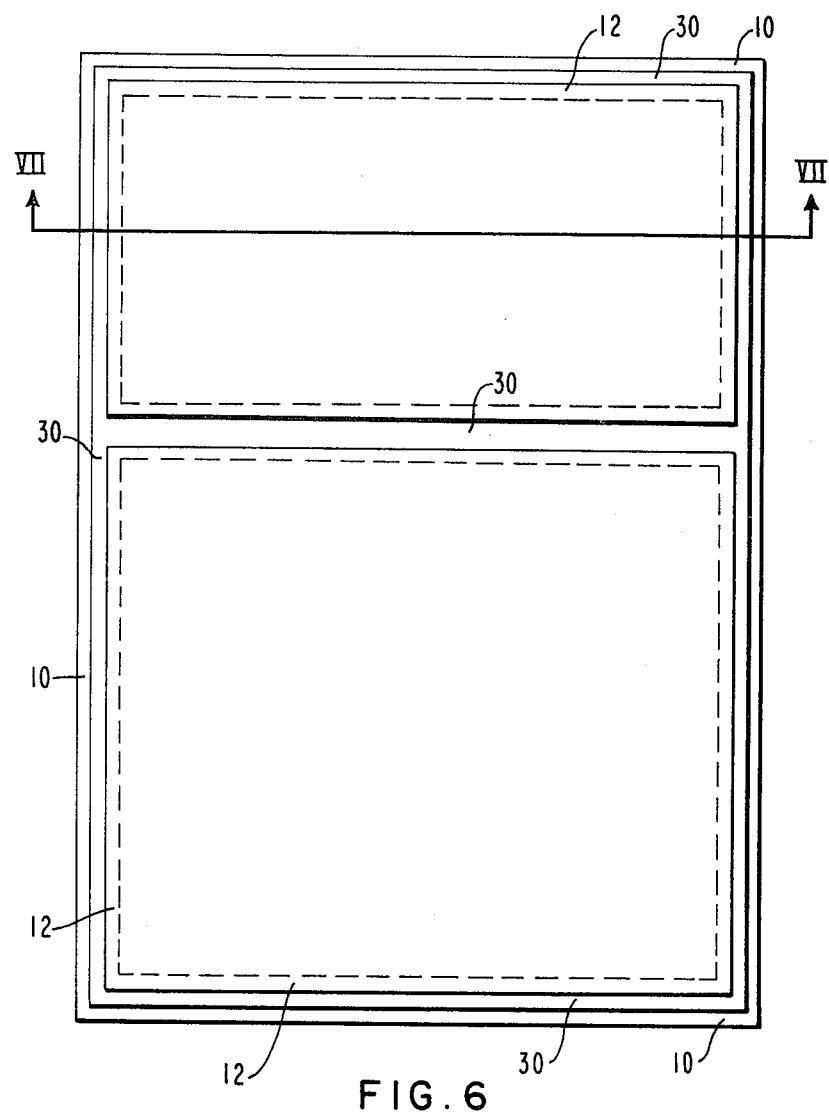
FIG. 6 illustrates a top view of a large plate clad with two separate cladding sheets.

FIG. 6 illustrates the use of the present invention to facilitate the cladding of very large plates. This application was discussed above in conjunction with FIG. 2 and will be described in greater detail below. FIG. 6 shows a large plate made of a base material 10. In this example, the base material 10 is too large to be clad with a single explosively welded plate and, therefore, two separate cladding layers 12 are explosively welded to the base member 10. When a large clad plate, like that shown in FIG. 6, is made in conjunction with the present invention, an intermediate layer 30 is provided at all regions where an edge of the cladding layer 12 could possible come into close proximity with the base member 10. In FIG. 6 this cladding member 30 can be seen to comprise two rectangular shapes which combine to generally resemble the shape of the numeral "8". The intermediate material 30 is disposed in a recess in the upper surface of the base member 10 and is machined or otherwise formed to have an upper surface which is generally coplanar with the upper surface of the base member 10. The cladding layers 12 can then be explosively welded, individually, to the surface which is a composite of base material 10 and intermediate layer 30. Therefore, it should be apparent that a large clad surface, such as that illustrated in FIG. 6, can be produced in accordance with the present invention.

Figure 7:
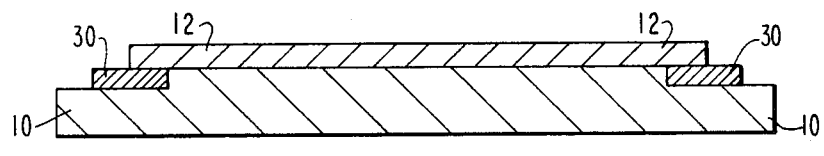
FIG. 7 shows a cross-sectional view of the large clad plate of FIG. 6.

FIG. 7 illustrates a cross-sectional view taken of the large plate illustrated in FIG. 6. In FIG. 7, the base member 10 is shown to have a recess 32 formed in its upper surface. This recess 32, although not shown in FIG. 6, would take the shape of the FIG. 8 in which the intermediate layer 30 is shown to be disposed. Referring once again to FIG. 7, the intermediate layer 30 is shown disposed in the recess 32 which had been machined or otherwise formed in the upper surface of the base member 10. After the intermediate layer is machined or otherwise formed to be coplanar with the upper surface of the base member 10, the cladding layer 12 can be explosively welded to this composite member. Using the cross-sectional view shown in FIG. 7 as an illustrative example, the important elements of the present invention can be clearly seen. The base member 10 is caused to have a recess 32 proximate the area where the edge of the cladding member 12 will eventually be disposed. In the recess 32, an intermediate member 30 is disposed, either by explosively welding it to the base member 12 or by depositing it by any suitable weld-deposit method. The intermediate layer 30 need only weldable to other similarly clad plates and provides a means for cladding extremely large base members. The Table refers to the materals which can be used in combination with each other and identifies the columns by both the terminology used throughout the specification and the reference numerals used in FIGS. 1, 2, 3, 4, 6 and 7. The Table is shown in order to illustrate a few specific combinations of materials and it should be understood that the Table does not include a total list of all possible combinations of materials and does not represent the total scope of the present invention. The weld deposits shown in the Table are designated by both their trade nomenclature and their ASME identification. It should be understood that the reference to 304 Chemistry Stainless Steel and 316 Chemistry Stainless Steel include within their scope welding alloys, such as 309 and 309Mo, which approximate their chemistry when diluted with the carbon steel of the base member.

| BASE MEMBER | CLADDING LAYER | INTERMEDIATE LAYER | BASE MEMBER WELD | INTERMEDIATE MEMBER WELD Ref. #60 | |
|---|---|---|---|---|---|
| Ref. #10 | Ref. #12 | Ref. #30 | Ref. #50 | Common Name | ASME Designation |
| Carbon Steel | Titanium | Inconel 600 | Carbon Steel | E182 or EN82 | ASME:SFA-5.11 Class EN:CrFe—3 or ASME:SFA-5.14 Class ERNiCr—3 |
| Carbon Steel | Titanium | Inconel 625 | Carbon Steel | E112 | ASME:SFA-5.11 Class ENiCrMo—5 |
| Carbon Steel | Titanium | 304 Chemistry Stainless Steel | Carbon Steel | E309 | ASME:SFA-5.4 Class E309 |
| Carbon Steel | Titanium | 316 Chemistry Stainless Steel | Carbon Steel | E309Mo | ASME:SFA-5.4 Class E309Mo |
| Carbon Steel | Aluminum | Inconel 600 | Carbon Steel | E182 or EN82 | ASME:SFA-5.11 Class ENiCrFe—3 or ASME:SFA-5.14 Class ERNiCr—3 |
| Carbon Steel | Aluminum | Inconel 625 | Carbon Steel | E112 | ASME:SFA-5.11 Class ENiCrMo—5 |
| Carbon Steel | Aluminum | 304 Chemistry Stainless Steel | Carbon Steel | E309 | ASME:SFA-5.4 Class E309 |
| Carbon Steel | Aluminum | 316 Chemistry Stainless Steel | Carbon Steel | E309Mo | ASME:SFA-5.4 Class E309Mo | occupy the area over which the edge of the cladding layer 12 will lie. In FIG. 7, the intermediate layer 30 is shown to be recessed from the edge of the base member 10, but it should be understood that this is not a necessary element of the present invention. The cladding layer 12 is also shown to be recessed from the outer edge of the intermediate layer 30. This characteristic is an important attribute of the present invention in that it allows the cladding layer 12 to be displaced from possible proximity with the base member 10 in regions where the two would also come into contact with a corrosive environment, such as brackish water. The cladding layer 12 can also be welded to the intermediate layer 30 (this weld is not shown in FIG. 7), but this is an optional procedure which is not a requirement for a clad plate made in accordance with the present invention. The base member 10 is typically made of a material which can provide sufficient structural integrity for the intended application. This material could generally be carbon steel. The cladding material can be a corrosion-resistant material, such as aluminum or titanium, but could also be any material which provides a characteristic which is not available in the base material. The intermediate layer 30 can be any material which is compatible with both the base member 10 and the cladding layer 12. In the case where the base material 10 is carbon steel and the cladding layer 12 is titanium or aluminum, the intermediate layer 30 can typically be made of Inconel 600, Inconel 625, 304 chemistry stainless steel or 316 chemistry stainless steel.

The Table shown below illustrates some typical examples of materials that can be used in accordance with the present invention to provide a clad plate which is It should be apparent that the present invention provides a means that permits both the manufacture of extremely large clad metal plates and the welding together of clad metal plates without the problems which are normally associated when dissimilar metals are welded.

It should be understood that although the present invention has been described with a significant amount of specific examples and in considerable detail, the present invention should not be considered to be so limited. The use of other specific materials and configurations should be considered to be within the scope of the present invention.

What we claim is:

1. A weldable-edge construction for a clad component, comprising:
   a base member having a planar surface, a recess, and an edge portion;
   a ribbon of cladding material having two generally parallel surfaces one of which is metallurgically bonded to said base member, said ribbon being disposed in said recess in said planar surface in such a way that the other of said surfaces of said ribbon is generally coplanar with said planar surface of said base member; and
   a sheet of cladding material metallurgically bonded to said base member and said other surface of said ribbon, said sheet being generally parallel to and over laying said planar surface of said base member, and a preselected portion of said ribbon, whereby said edge portion of said sheet is recessed from one edge of said ribbon.

2. The construction of claim 1, wherein: said edge portion of said base member is tapered away from said ribbon of cladding material at a preselected angle.

3. The construction of claim 1, wherein: said base member is made of carbon steel.

4. The construction of claim 1, wherein: said sheet of cladding material is made of titanium.

5. The construction of claim 1, wherein: said sheet of cladding material is made of aluminum.

6. The construction of claim 1, wherein there is a seal weld at the juncture of said edge of said sheet of cladding material and said ribbon of cladding material.

7. The construction of claim 4, wherein said ribbon of cladding material is made of titanium.

8. The construction of claim 5, wherein said ribbon of cladding material is made of aluminum.

9. A method for making a clad material, comprising: providing a base member;
forming a recess in a planar surface of said base member;
disposing a ribbon of cladding material having two generally parallel surfaces within said recess so that one of said surfaces of said ribbon is generally coplanar with said planar surface;
metallurgically bonding the other of said surfaces of said ribbon to the recessed portion of said based member;
overlaying a sheet of cladding material on said planar surface so that an edge of said sheet extends a preselected amount over said ribbon; and
metallurgically bonding said sheet of cladding material to said base member and to said ribbon of cladding material.

10. The method of claim 9, wherein: said ribbon of cladding material is metallurgically bonded by the deposition of weld metal within said recess.

11. The method of claim 9, wherein: said sheet of cladding material is metallurgically bonded to said base member and said ribbon of cladding material by explosively welding it thereto.

12. The method of claim 9 and further comprising the step of utilizing aluminum as the cladding material.

13. The method of claim 9 and further comprising the step of utilizing titanium as the cladding material.

14. The method of claim 9 and further comprising the step of utilizing carbon steel or the base member.

* * * * *